United States Patent
Hasegawa et al.

(10) Patent No.: US 7,394,752 B2
(45) Date of Patent: Jul. 1, 2008

(54) JOINT REDUCTION OF NEXT AND FEXT IN XDSL SYSTEMS

(75) Inventors: Kazutomo Hasegawa, Kawasaki (JP); Georgios Ginis, Mountain View, CA (US); Carlos Aldana, Irvine, CA (US); John M. Cioffi, Atherton, CA (US)

(73) Assignees: The Board of Trusttees of the Leland Stanford Junior University, Palo Alto, CA (US); Fujitsu Limited, Kanagawa (JP)

( * ) Notice: Subject to any disclaimer, the term of this patent is extended or adjusted under 35 U.S.C. 154(b) by 1132 days.

(21) Appl. No.: 10/286,185

(22) Filed: Oct. 31, 2002

(65) Prior Publication Data

US 2003/0086362 A1    May 8, 2003

Related U.S. Application Data

(60) Provisional application No. 60/338,219, filed on Nov. 6, 2001.

(51) Int. Cl.
  *H04J 1/12* (2006.01)
(52) U.S. Cl. .................................. 370/201; 370/286
(58) Field of Classification Search .................. 370/201
  See application file for complete search history.

(56) References Cited

U.S. PATENT DOCUMENTS

| 5,181,198 | A  | * | 1/1993  | Lechleider .................. 370/286 |
| 5,887,032 | A  |   | 3/1999  | Cioffi |
| 6,236,645 | B1 | * | 5/2001  | Agazzi ........................ 370/286 |
| 6,304,598 | B1 | * | 10/2001 | Agazzi et al. ............... 375/232 |
| 6,839,429 | B1 | * | 1/2005  | Gaikwad et al. ............ 379/417 |
| 6,975,677 | B2 | * | 12/2005 | Matsumoto .................. 375/232 |
| 7,016,822 | B2 | * | 3/2006  | Bosley et al. .................. 703/2 |
| 7,023,910 | B1 | * | 4/2006  | Norrell ........................ 375/222 |
| 2001/0004383 | A1 | * | 6/2001 | Nordstrom et al. .......... 375/222 |

* cited by examiner

*Primary Examiner*—Chau T. Nguyen
*Assistant Examiner*—Kenneth R Hartmann, II
(74) *Attorney, Agent, or Firm*—Beyer Law Group LLP

(57) ABSTRACT

Methods, apparatus, techniques and computer program products for joint reduction of crosstalk in a synchronized, time division duplexed DSL systems use sequential removal of NEXT interference followed by removal of FEXT interference from a received DSL signal. Crosstalk is removed from a primary signal in a synchronized TDD DSL system having a primary channel that carries the primary signal, at least one NEXT generating channel that generates NEXT interference in the primary signal and at least one FEXT generating channel that generates FEXT interference in the primary signal. Signal data is acquired, where the signal data includes received signal data for the primary channel and at least one FEXT generating channel, transmitted signal data for at least one NEXT generating channel, and channel data comprising channel transfer function data and crosstalk coupling coefficient data for the primary channel, each NEXT generating channel and each FEXT generating channel. After the signal data is acquired, NEXT interference in the primary signal is then removed using the transmitted signal data and the channel data, followed by removal of FEXT interference in the primary signal using vectored DMT FEXT removal, the received signal data and the channel data. In another system in which FEXT generating received signals are not necessarily available, FEXT removal can be achieved using expectation cancellation, the primary signal and the channel data in connection with possible transmitted signal values.

15 Claims, 7 Drawing Sheets

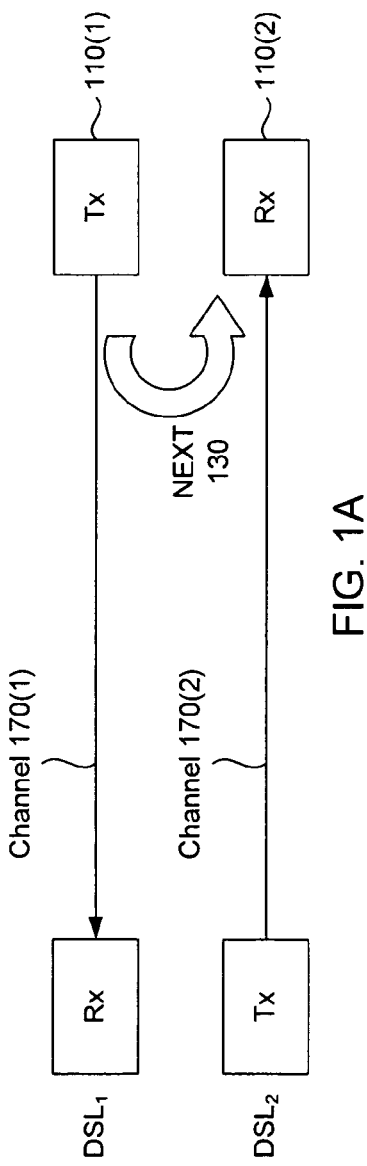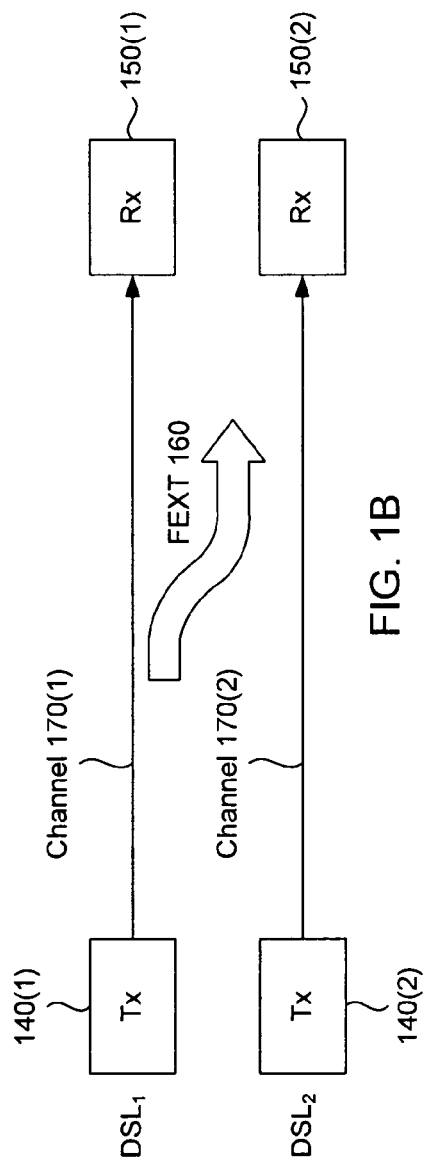

JOINT REDUCTION OF NEXT AND FEXT IN XDSL SYSTEMS

CROSS-REFERENCE TO RELATED APPLICATION

This application claims the benefit of U.S. Provisional No. 60/338,219 filed on Nov. 6, 2001, the disclosure of which is incorporated herein by reference.

BACKGROUND OF THE INVENTION

The present invention relates to data transmission systems and, more particularly, to the removal of crosstalk interference in a communication system.

Digital subscriber line (DSL) technology uses existing telephone twisted pairs to provide high-speed internet access services to both residential and business customers. There are many types of DSLs, which are generically referred to as xDSL, including basic rate DSL (ISDN), high-bit-rate DSL (HDSL), second generation HDSL (HDSL2), asymmetric DSL (ADSL), symmetrical DSL (SDSL), and very-high-bit-rate DSL (VDSL). Information regarding this area can be found in Chen, "The Development and Standardization of Asymmetrical Digital Subscriber Line", IEEE Communications Magazine, Volume 37, Number 5, pp. 68-72, May 1999. Today in the United States, several million telephone lines between central offices (COs) and subscribers are deployed with xDSL technology, and the number of the subscribers is rising rapidly.

Multicarrier modulation is a means of transmitting data by first dividing the binary digital data stream to be transmitted into blocks or frames. The blocks are then further grouped into sub-blocks for assignment to a given transmission symbol. As an example, each sub-block may contain one to eight bits, and 100 sub-blocks will form a frame. For analog transmission across the communication channel, a set of carrier signals is used with frequencies that lie at evenly spaced values across the usable frequency band. This set of carrier signals is equal in number to the number of sub-blocks within a block. Continuing the above example, with a sampling frequency of 1.0 MHz, 100 carrier signals would be used at multiples of 10 kHz. The bits within each sub-block are then used to modulate the corresponding carrier signal. The set of modulated carriers are then added together, and the resultant signal is transmitted across the channel. Multicarrier modulation is described more fully in "Multicarrier Modulation for Data Transmission: An Idea whose Time Has Come", J. A. C. Bingham, IEEE Communications Magazine, 28(5):5-14, May 1990.

In particular, ADSL can use discrete multitone transmission (DMT) as its line code. DMT is a form of multicarrier modulation that is implemented with digital signal processing. Frequently, the method of modulation in the transmitter uses an Inverse Fast Fourier Transform (IFFT), which generates samples of a transmit signal for each block of data bits. In the receiver, the received signal is demodulated in connection with each of the carriers, and the data bits are recovered from each carrier. A complementary or reciprocal method of demodulation samples the received signal, group the samples into blocks, and perform a Fast Fourier Transform (FFT). DMT is discussed in detail in "Discrete Multiple Tone Modulation with Coset Coding for the Spectrally Shaped Channel", A. Ruiz, J. M. Cioffi, and S. Kasturia, IEEE Transactions on Communications, 40:1012-29, June 1992.

A wide band modulation approach like DMT can present obstacles. One particular problem relates to crosstalk interference that is introduced to the twisted pair transmission line and received by the DSL modem. As is well known to those skilled in the art, crosstalk interference is unwanted interference (signal noise) that is passed between adjacent lines, network cables or other devices. Crosstalk generally occurs due to coupling between wire pairs when wire pairs in the same or a nearby bundle are used for signal transmission. In this manner, data signals from one or more sources may be superimposed on and contaminate a data signal from a different source. Crosstalk can include near-end crosstalk (NEXT) and far-end crosstalk (FEXT). FIGS. 1A and 1B of the drawings illustrate these two types of crosstalk.

In FIGS. 1A and 1B, there are two DSL lines or channels, $DSL_1$ 170(1) and $DSL_2$ 170 (2), and crosstalk 130, 160 that leaks from $DSL_1$ to $DSL_2$. In FIG. 1A, NEXT crosstalk 130 contaminates the received signal of $DSL_2$ from the transmit signal of $DSL_1$, where the transmitter 110(1) of $DSL_1$ is located near the receiver 110(2) of $DSL_2$. In FIG. 1B, where the transmitter 140(1) of $DSL_1$ is located far from the receiver 150(2) of $DSL_2$, FEXT crosstalk 160 from the transmit signal of $DSL_1$ contaminates the received signal of $DSL_2$ through lines 170(1) and 170(2).

In Japan TCM (Time Compressed Multiplex) ISDN is used, which is a potential source of crosstalk to a DSL system. For that reason, ADSL may have two additional specifications. One of them is ADSL Annex C. The other is ADSL Annex H, which is also named SSDSL (Synchronized Symmetrical DSL) and is synchronized with ISDN to avoid NEXT between it. SSDSL is a synchronized, time division duplexed (TDD) system and, as used herein, the terms "SSDSL" and "synchronized TDD DSL" generally refer to the same type of DSL system.

A brief description of ADSL Annex C is given in, K. Narumiya, "A Consideration of ADSL Service under NTT's Network", IEEE Communications Magazine, Volume 37, Number 5, pp. 98-101, May 1999. Both Annex C and SSDSL are synchronized with TCM ISDN with a 400 Hz period, which uses a half-duplex transmission method. However, there is a difference in the frequency band between them. Annex C uses the band from 25 kHz to 138 kHz for upstream and from 138 kHz to 1.104 MHz (552 kHz) for downstream. On the other hand, SSDSL uses the band from 25 kHz to 1.104 MHz for both upstream and downstream. There are many systems in which FEXT interference may arise. However, it has not been a big problem for them, because the amount of FEXT is small enough not to affect received signals. On the other hand, there are a few systems in which NEXT interference is included among DSLs, because systems have been designed to avoid NEXT interference that would be big enough to affect received signals. However, for example, upstream signals of SSDSL and downstream signals of VDSL use the same frequency band, so NEXT may arise among them.

NEXT interference in these synchronized, time division duplexed systems is explained in detail in U.S. Pat. No. 5,887,032, entitled METHOD AND APPARATUS FOR CROSSTALK CANCELLATION, and issued Mar. 23, 1999, which is incorporated herein by reference in its entirety. NEXT cancellation in a synchronized TDD system also is described in detail in the '032 Patent.

As can be appreciated, data signals being transmitted over twisted-pair phone lines can be significantly degraded by the crosstalk interference generated on one or more adjacent twisted-pair phone lines in the same and/or a nearby bundle. Therefore, crosstalk problems arising from using twisted-pair phone lines with high data transmission rates, including ADSL and VDSL for example, can substantially inhibit proper transmission of data signals. Thus, there is a need to provide apparatus, methods, techniques and/or computer program products to jointly remove and/or reduce crosstalk interference effects.

SUMMARY OF THE INVENTION

The present invention concerns removing (that is, reducing or eliminating) crosstalk interference in transmitted signals in a synchronized TDD DSL system. In particular, the present invention provides methods, apparatus, techniques and computer program products for joint reduction of crosstalk in such synchronized TDD DSL systems using a sequential removal of NEXT interference followed by removal of FEXT interference from a received DSL signal.

One method of removing crosstalk from a primary signal according to one embodiment of the present invention takes is performed in a synchronized TDD DSL system comprising a primary channel that carries the primary signal, at least one NEXT generating channel that generates NEXT interference in the primary signal and at least one FEXT generating channel that generates FEXT interference in the primary signal. The method includes acquiring signal data, where the signal data includes (i) received signal data for the primary channel and at least one FEXT generating channel, (ii) transmitted signal data for a NEXT generating channel, and (iii) channel data comprising channel transfer function data and crosstalk coupling coefficient data for the primary channel, the NEXT generating channel and the FEXT generating channel. After acquiring the signal data, NEXT interference in the primary signal is then removed using the transmitted signal data and the channel data. After removing the NEXT interference (or some threshold amount), FEXT interference in the primary signal can be removed using vectored DMT FEXT removal, the received signal data and the channel data.

The vectored DMT FEXT removal can incorporate (i) organizing the channel data for any of the FEXT generating channels and the primary channel into a FEXT data matrix, then (ii) calculating a QR decomposition for the FEXT data matrix, and finally (iii) calculating a primary signal estimate that is an estimate of the primary signal. The transmitted signal data can include a transmitted signal transmitted on the NEXT generating channel and transmission power level data for that transmitted signal. The received signal data can include a received signal received on the FEXT generating channel, bit allocation data for the received signal, transmission power level data for the received signal, the primary signal received on the primary channel, bit allocation data for the primary signal, and transmission power level data for the primary signal.

Removing NEXT interference may consist of calculating the NEXT interference contribution from each NEXT generating channel using the transmitted signal data and the channel data relating to the coupling between that NEXT generating channel and the primary channel and subtracting the calculated NEXT interference contribution of that NEXT generating channel from the primary signal. These methods can be applied in systems where one or more channels inject NEXT interference into the primary signal and where one or more lines inject FEXT interference into the primary signal.

According to another embodiment of the present invention, a system for removing crosstalk from a primary signal possesses a set of channels and a calculation unit connected to the set of channels. The set of channels includes (i) a primary channel on which the primary signal is sent, (ii) a first subset of transmitting channels, and (iii) a first subset of receiving channels. The calculation unit is configured to acquire signal data, which can include transmitted signal data for any NEXT generating channel that is in the first subset of transmitting channels, received signal data for any FEXT generating channel that is in the first subset of receiving channels, and channel data comprising channel transfer function data and crosstalk coupling data for the primary channel, any NEXT generating channel and any FEXT generating channel. The calculation unit is further configured to remove NEXT interference in the primary signal using the transmitted signal data and the channel data, and then remove FEXT interference in the primary signal using a vectored DMT cancellation process and the received signal data and the channel data.

A different embodiment of the present invention is a method of removing crosstalk from a primary signal sent over a primary channel performed in a synchronized TDD DSL system having at least one NEXT generating channel that generates NEXT interference in the primary signal and at least one FEXT generating channel that generates FEXT interference in the primary signal. The method starts by acquiring signal data, where the signal data includes (i) received signal data for the primary channel, (ii) transmitted signal data for the NEXT generating channel, and (iii) channel data which comprises noise variance data, channel transfer function data and crosstalk coupling data for the primary signal channel, the NEXT generating channel and the FEXT generating channel. Once this signal data is acquired, NEXT interference in the primary signal is removed using the transmitted signal data and the channel data. Thereafter, FEXT interference in the primary signal is removed using expectation cancellation (EC), the primary signal and the channel data. The expectation cancellation can consist of calculating a conditional probability of the primary signal in light of a set of possible transmitted signals.

The transmitted signal data can comprise a transmitted signal transmitted on the NEXT generating channel and transmission power level data for the transmitted signal. The received signal data can comprise the primary signal, bit allocation data for the primary signal and the FEXT generating channel and transmission power level data for the primary signal and for the FEXT generating channel. Removing NEXT interference can include calculating NEXT interference from each NEXT generating channel using the transmitted signal data and the channel data relating to the coupling between the NEXT generating channel and the primary channel and subtracting the calculated NEXT interference from the primary signal. That removal of NEXT interference from the primary signal can be performed until a prescribed minimum amount of NEXT contamination is present in the primary signal.

Still another embodiment of the present invention is a system for removing crosstalk from a primary signal where the system incorporates a primary channel on which the primary signal is sent, a NEXT generating channel, a FEXT generating channel and a calculation unit connected to the primary channel. The calculation unit is configured to acquire signal data, wherein the signal data includes transmitted signal data for the NEXT generating channel, received signal data for primary channel and channel data (such as channel transfer function data and crosstalk coupling coefficient data). The channel data may include noise variance data, channel transfer function data and crosstalk coupling data for the primary signal channel, the NEXT generating channel and the FEXT generating channel. Once this data is acquired by the calculation unit, it is configured to first remove NEXT interference in the primary signal using the transmitted signal data and the channel data and then remove FEXT interference in the primary signal using expectation cancellation, the primary signal and the channel data.

Other aspects and advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 1A is a DSL system illustrating NEXT interference.

FIG. 1B is a DSL system illustrating FEXT interference.

DETAILED DESCRIPTION OF THE INVENTION

Methods, techniques, apparatus, products, devices and protocols appropriate for implementing a system for jointly eliminating or mitigating the effects of NEXT and FEXT in xDSL systems will now be described in detail with reference to preferred embodiments thereof and as illustrated in the accompanying Figures. In the following description, specific details are set forth in order to provide an understanding of the present invention. It will be apparent, however, to one skilled in the art, that the present invention may be practiced without some or all of these specific details. In other instances, well known process steps, components, features and/or aspects of the invention as presented have not been described in detail in order to avoid unnecessarily obscuring the present invention.

Briefly, the present invention constitutes the joint reduction of NEXT and FEXT in combination in synchronized TDD DSL systems using known synchronized TDD DSL NEXT mitigation/removal techniques and known FEXT mitigation/removal techniques that previously have not been used in combination in such systems. More specifically, the present invention involves collecting data relating to the transmission and reception of data on communication lines in which crosstalk may arise. Specifically, the present invention utilizes knowledge of the channel transfer functions and the crosstalk coupling coefficients. These functions and coefficients can be found using any appropriate means or methodology, for example one based on a least squares method or an expectation cancellation (EC) method. The collected data is then used to jointly cancel both NEXT and FEXT in combination. The present invention may be implemented within each subcarrier in the frequency domain, which is suitable for multicarrier data transmission. NEXT is first canceled with a calculation in the frequency domain. After removal of NEXT contamination, FEXT is then canceled. FEXT cancellation can be performed using an appropriate methodology and/or apparatus, for example one based on a vectored DMT (VDMT) method or an EC method. The cancellations can be performed, if desired and/or convenient, at an xDSL system CO or other suitable location (for example, a system RT or ONU). The defining characteristic of the location is that a sufficient number of DSL lines preferably terminate at the location, such as the boundary between the "access" and the "backbone" networks. For purposes of illustration, and without limiting the scope of the present invention, several examples will be discussed in which joint cancellation or mitigation of NEXT and FEXT is performed in a CO.

Figure 2:
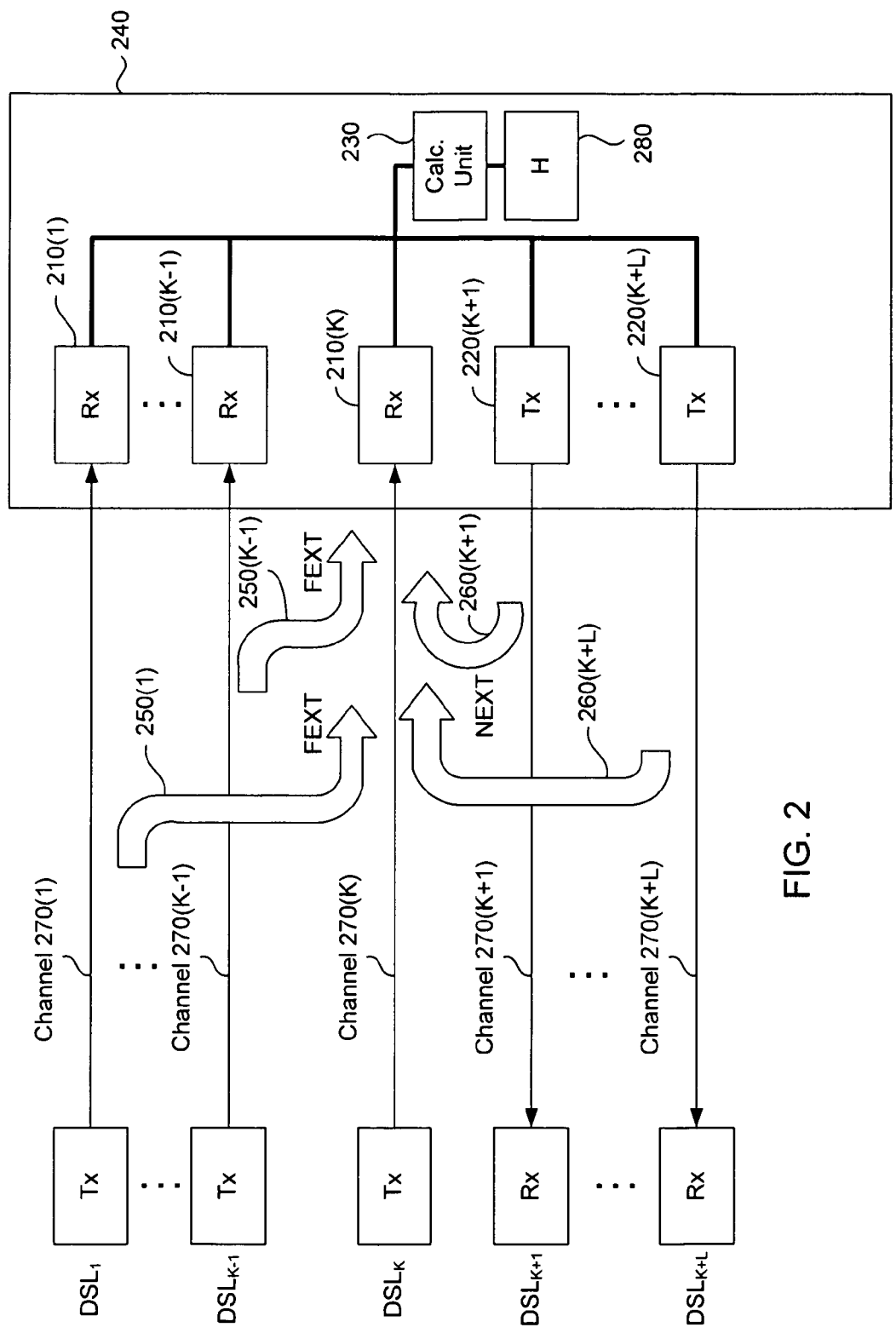
FIG. 2 is DSL system incorporating one embodiment of the present invention.

In one embodiment, an exemplary system of which is illustrated in FIG. 2, a single calculation unit is connected to a plurality of CO receivers and transmitters (these may also be unitary transceiver devices). This situation might be appropriate where a single company or other entity owns all of the lines and/or data being received on the lines connected to the calculation unit in the CO. Alternatively, an independent party could manage and operate a crosstalk removal system for parties using the DSL lines in the system. The CO calculation unit is configured to acquire appropriate signal data from the system and transceivers and to cancel both NEXT and FEXT.

Figure 5:
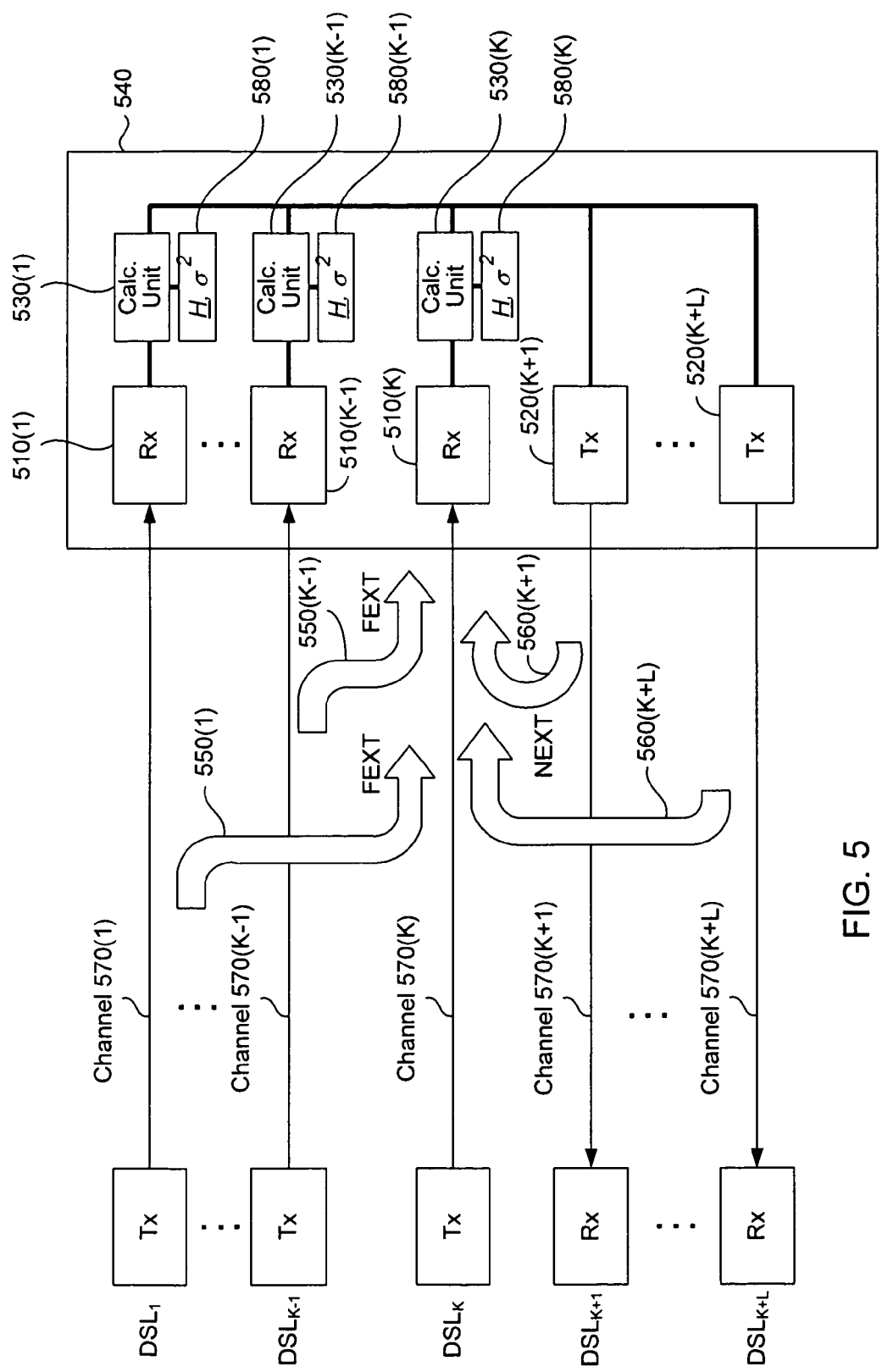
FIG. 5 is a DSL system utilizing another embodiment of the present invention.

In another embodiment of the present invention, an exemplary system of which is illustrated in FIG. 5, each receiver in the CO may be connected to its own separate calculation unit. This arrangement might be appropriate where different entities own the various lines and/or data being received on the various lines in the CO.

The DSL system can be any of several different types, which may affect the complexity of crosstalk removal. For example, a received SSDSL signal can be affected by NEXT from one or more ADSL or VDSL transmit signals, and FEXT from the transmit signal of another SSDSL line at the CO unit. In such cases, the present invention can cancel both NEXT and FEXT at the CO unit. Consequently, the present invention provides a synchronized TDD DSL system in which the effects of NEXT and FEXT are jointly reduced or eliminated. This crosstalk removal can lead to improvements in the performance of the synchronized TDD DSL system, such as increased bit rates of the lines in the DSL system.

One embodiment of the present invention is illustrated in FIG. 2. The DSL environment has K+L DSL lines, including a primary DSL line, $DSL_K$, and multiple FEXT generating lines and multiple NEXT generating lines. As will be appreciated by those skilled in the art, the present invention can be applied to a wide variety of situations and synchronized TDD DSL systems. For example, there may be very few lines introducing NEXT and/or very few lines introducing FEXT. Conversely, a large number of lines may contribute FEXT to the signal of interest, and similarly a large number of lines may contribute NEXT as well. The apparatus, techniques and methods of the present invention may be adapted to these and many other, more complicated systems. Only a few of multiple FEXT and NEXT lines will be shown and explained herein for purposes of illustration.

Notation in this description is for convenience and purposes of explanation and illustration. For example, $DSL_K$ and $DSL_{K+1}$ are not necessarily consecutive lines in a binder, physically adjacent nor even in the same binder. As will be appreciated by those skilled in the art, different lines may contribute differently to crosstalk contamination. The present invention can be used to remove as much crosstalk as possible, or only the crosstalk interference above a given threshold level, depending upon the needs and desires of the users and operators of the DSL system(s).

In the system of FIG. 2, NEXT interference is first removed as discussed in detail below. After removal of the NEXT interference from any relevant signal(s), FEXT is then removed. When several receivers in a CO share a single calculation unit that has certain received data available, FEXT interference can be canceled using Vectored-DMT (VDMT) as described by Ginis and Cioffi in "Vectored-DMT: A FEXT Canceling Modulation Scheme for Coordinating Users", ICC, Helsinki, Finland, Jun. 11-14, 2001, which is incorporated herein by reference in its entirety. Techniques, methods and apparatus for use in connection with FEXT interference generated in an upstream direction will be described here with reference to the exemplary situation depicted in FIG. 2. As will be appreciated by those skilled in the art, with minor modification, interference in the downstream direction also may be reduced or eliminated.

There are (K+L) synchronized TDD DSL channels 270(1), (2), ..., (K−1), (K), (K+1), (K+2), ..., (K+L) corresponding to $DSL_1, DSL_2, \ldots, DSL_{K-1}, DSL_K, DSL_{K+1}, DSL_{K+2}, \ldots, DSL_{K+L}$ in the example of FIG. 2. The receivers (or receiving transceivers) 210(1), (2), ..., (K) of $DSL_1, DSL_2, \ldots, DSL_K$ and the transmitters (or transmitting transceivers) 220(K+1), (K+2), ..., (K+L) of $DSL_{K+1}, DSL_{K+2}, \ldots, DSL_{K+L}$ are connected to a common calculation unit 230 and all of them are located in a CO unit 240. FIG. 2 illustrates the case where the received signal of $DSL_K$ can be affected by FEXT 250(1), (2), ..., (K−1) from one or more of the transmit signals of $DSL_1, DSL_2, \ldots, DSL_{K-1}$ and NEXT 260(K+1), (K+2), ..., (K+L) from one or more of the transmit signals of $DSL_{K+1}, DSL_{K+2}, \ldots, DSL_{K+L}$. The present example focuses on only one primary received signal (on line $DSL_K$) to illustrate joint NEXT and FEXT reduction or cancellation using the present invention. However, as will be appreciated by those skilled in the art, any and all of the received signals may be materially affected by NEXT and FEXT. Application of the present invention to any crosstalk affected DSL lines can reduce or eliminate NEXT and FEXT contamination in those lines.

$DSL_1, DSL_2, \ldots, DSL_K$ may use DSL types different than $DSL_{K+1}, DSL_{K+2}, \ldots, DSL_{K+L}$. However, the line code of all DSLs is the same (for example, DMT) and all are synchronized TDD DSLs. The type of DSL system used for $DSL_1, DSL_2, \ldots, DSL_K$ also does not matter; however, in this description, the line code of all DSLs is presumed to be the same and all are synchronized TDD DSLs.

For example, downstream VDSL can affect upstream received signals of SSDSL with big NEXT. Upstream received signals of SSDSL also can be contaminated by FEXT interference from another SSDSL's transmitted signals. Such situations are appropriate examples of cases where the present invention can be utilized to reduce or eliminate crosstalk interference.

Synchronization is needed for the crosstalk cancellation algorithm because accurate Fourier transforms and inverse Fourier transforms can be performed only when synchronization is established. If synchronization is not established between some DSLs, the crosstalk from interferers may spread beyond a given subcarrier and thus make it impossible to estimate the amount of the crosstalk.

The transmitted signals of $DSL_1, DSL_2, \ldots, DSL_K$, $DSL_{K+1}, DSL_{K+2}, \ldots, DSL_{K+L}$ may be represented in the frequency domain as $X_1, X_2, \ldots, X_K, X_{K+1}, X_{K+2}, \ldots, X_{K+L}$ and the received signals of $DSL_1, DSL_2, \ldots, DSL_K$ as $Y_1, Y_2, \ldots, Y_K$. We also define the channel transfer function of $DSL_i (i=1,2, \ldots, K)$ as $H_{i,i}$ and the crosstalk coupling coefficient from $DSL_j$ to $DSL_i$ as $H_{i,j} (j=1,2, \ldots, K, K+1, K+2, \ldots, K+L; j \neq i)$.

Then, the received signals $Y_i$ in the noiseless case may be expressed in a matrix form with the transmit signals, the channel transfer functions and the crosstalk coupling coefficients as given by Equation (1):

$$\begin{pmatrix} Y_1 \\ Y_2 \\ \vdots \\ Y_K \end{pmatrix} = \begin{pmatrix} H_{1,1} & H_{1,2} & \ldots & H_{1,K} & H_{1,K+1} & H_{1,K+2} & \ldots & H_{1,K+L} \\ H_{2,1} & H_{2,2} & \ldots & H_{2,K} & H_{2,K+1} & H_{2,K+2} & \ldots & H_{2,K+L} \\ \vdots & \vdots & & \vdots & \vdots & \vdots & & \vdots \\ H_{K,1} & H_{K,2} & \ldots & H_{K,K} & H_{K,K+1} & H_{K,K+2} & \ldots & H_{K,K+L} \end{pmatrix} \begin{pmatrix} X_1 \\ X_2 \\ \vdots \\ X_K \\ X_{K+1} \\ X_{K+2} \\ \vdots \\ X_{K+L} \end{pmatrix} \quad (1)$$

Equation (1) also may be expressed using vectors $\underline{X}$, $\underline{Y}$ and matrix $\underline{H}$ as in Equation (2):

$$\underline{Y} = \underline{H}\underline{X} \quad (2)$$

In this example of the present invention, the calculation unit 230 estimates the transmit signals $X_1, X_2, \ldots, X_K$ in the vector $\underline{X}$. Calculation unit 230 acquires received signal data, preferably from the receivers 210(1) through 210(K). In the preferred embodiment of the present invention, this received signal data includes:

the received signals $Y_1, Y_2, \ldots, Y_K$;
bit allocation data for these received signals; and
transmission power level data for the transmit signals $X_1, X_2, \ldots, X_K$.

The transmitters 220(K+1), (K+2), ..., (K+L) likewise can preferably supply calculation unit 230 with the transmitted signals $X_{K+1}, X_{K+2}, \ldots, X_{K+L}$ and transmission power level data for these signals. Finally, the calculation unit 230 acquires the matrix $\underline{H}$ from a data source 280. In the various embodiments of the present invention, it should be noted that power levels of various lines may also be estimated using training data rather than having the power level data supplied by a given component. Therefore, where the present description and claims call for acquisition of power level data (and other signal data), it may not be necessary for a calculation unit or other component to be supplied with this data by another component in every case. Such "acquisition" of data may include calculating the data or acquiring in other ways apparent to those skilled in the art.

In the first phase of the joint NEXT and FEXT reduction or removal of the present invention, the calculation unit 230 first calculates $\hat{Y}_i$ by removing NEXT from the received signals $Y_i$ using the matrix $\underline{H}$ and the transmit signals $X_{K+1}, X_{K+2}, \ldots, X_{K+L}$ using Equation (3):

$$\hat{Y}_i = Y_i - \sum_{j=K+1}^{K+L} (H_{i,j} X_j) \text{ for } (i = 1, \ldots, K) \quad (3)$$

Because of the system's knowledge of the crosstalk coupling coefficients and line transfer functions, and the knowledge of the signals transmitted from the location's transmitters, $\hat{Y}_i$ is a very close approximation to the actual received signals absent the NEXT interference. Any factors affecting the accuracy of this approximation are negligible. Stated another way:

$$\hat{Y}_i = Y_i - NEXT_i \quad (4)$$

for (i=1, . . . , K) and where
(j is the NEXT for lines K+1, . . . , K+L)

Using $\hat{Y}_i$ as calculated with Equation (3), the received signals with NEXT eliminated in the noiseless case can be expressed in a matrix form with the transmit signals, the channel transfer functions and the crosstalk coupling coefficients applicable to lines 270(1) through 270(K):

$$\begin{pmatrix} \hat{Y}_1 \\ \hat{Y}_2 \\ \vdots \\ \hat{Y}_K \end{pmatrix} = \begin{pmatrix} H_{1,1} & H_{1,2} & \ldots & H_{1,K} \\ H_{2,1} & H_{2,2} & \ldots & H_{2,K} \\ \vdots & \vdots & \ddots & \vdots \\ H_{K,1} & H_{K,2} & \ldots & H_{K,K} \end{pmatrix} \begin{pmatrix} X_1 \\ X_2 \\ \vdots \\ X_K \end{pmatrix} \quad (5)$$

That is, $\hat{Y}_i$ represents the received signal data of $Y_i$ for lines 270(1) through 270(K) with the NEXT interference from lines 270(K+1) through 270(K+L) removed. The present invention can be implemented to remove NEXT interference from all lines, from only those lines producing a preselected minimum level of disruptive NEXT interference, or in any other appropriate manner, as will be apparent to one skilled in the art.

However, after NEXT interference has been removed, FEXT interference remains in the received signals (that is, FEXT from lines $DSL_1$ through $DSL_K$ in FIG. 2). That FEXT interference is then removed as the next step and/or by apparatus in the present invention using a FEXT removal technique.

Equation (5) can be expressed using vectors $\underline{X}$, $\underline{\hat{Y}}$ and matrix $\underline{H}$:

$$\underline{\hat{Y}} = \underline{H}\underline{X} \quad (6)$$

The calculation unit 230 is configured to then estimate the vector $\underline{X}$, which contains the transmit signals $X_1, X_2, \ldots, X_K$. The receivers 210(1) through 210(K) preferably supply calculation unit 230 with bit allocation data and transmission power level data for the transmit signals $X_1, X_2, \ldots, X_K$. As noted above, the calculation unit 230 knows $\underline{H}$. Again, $\underline{H}$ at this step includes crosstalk values for the DSL channels that can generate FEXT interference in the system of FIG. 2.

The matrix $\underline{H}$ can be decomposed into a unitary matrix $\underline{Q}$ and an upper triangular matrix $\underline{R}$ using known QR decomposition:

$$\underline{H} = \underline{Q}\underline{R} \quad (7)$$

Assuming a noiseless case, a vector $\underline{\tilde{Y}}$ can be defined as the product of the vector $\underline{\hat{Y}}$ and the matrix $\underline{Q}^{-1}$:

$$\underline{\tilde{Y}} = \underline{Q}^{-1}\underline{\hat{Y}} = \underline{R}\underline{X} \quad (8)$$

Expressing this result in a matrix form produces:

$$\begin{pmatrix} \tilde{Y}_1 \\ \tilde{Y}_2 \\ \vdots \\ \tilde{Y}_K \end{pmatrix} = \begin{pmatrix} R_{1,1} & R_{1,2} & \ldots & R_{1,K-1} & R_{1,K} \\ 0 & R_{2,2} & \ldots & R_{2,K-1} & R_{2,K} \\ \vdots & \vdots & \ddots & \vdots & \vdots \\ 0 & 0 & \ldots & R_{K-1,K-1} & R_{K-1,K} \\ 0 & 0 & \ldots & 0 & R_{K,K} \end{pmatrix} \begin{pmatrix} X_1 \\ X_2 \\ \vdots \\ X_K \end{pmatrix} \quad (9)$$

Using this technique, an estimate of $X_K$ can be obtained. This estimate, designated $\tilde{X}_K$, is a close approximation of the transmitted values absent and NEXT and FEXT interference. So, the estimated value $\tilde{X}_K$ of $X_K$ corresponding to vector $\underline{\tilde{Y}}$ is then calculated:

$$\tilde{X}_K = \frac{\tilde{Y}_K}{R_{K,K}} \quad (10)$$

Next, knowing the value of $\tilde{X}_K$ from the previous equation, the estimated value $\tilde{X}_{K-1}$ of $X_{K-1}$ is calculated using:

$$\tilde{X}_{K-1} = \frac{\tilde{Y}_{K-1} - R_{K-1,K}\tilde{X}_K}{R_{K-1,K-1}} \quad (11)$$

In similar fashion, the estimated values $\tilde{X}_{K-2}$ to $\tilde{X}_1$ can be calculated. Thus, the estimated value of each transmit signal of $DSL_1, DSL_2, \ldots, DSL_K$, which contains no NEXT or FEXT interference contamination can be calculated at calculation unit 230.

Figure 3:
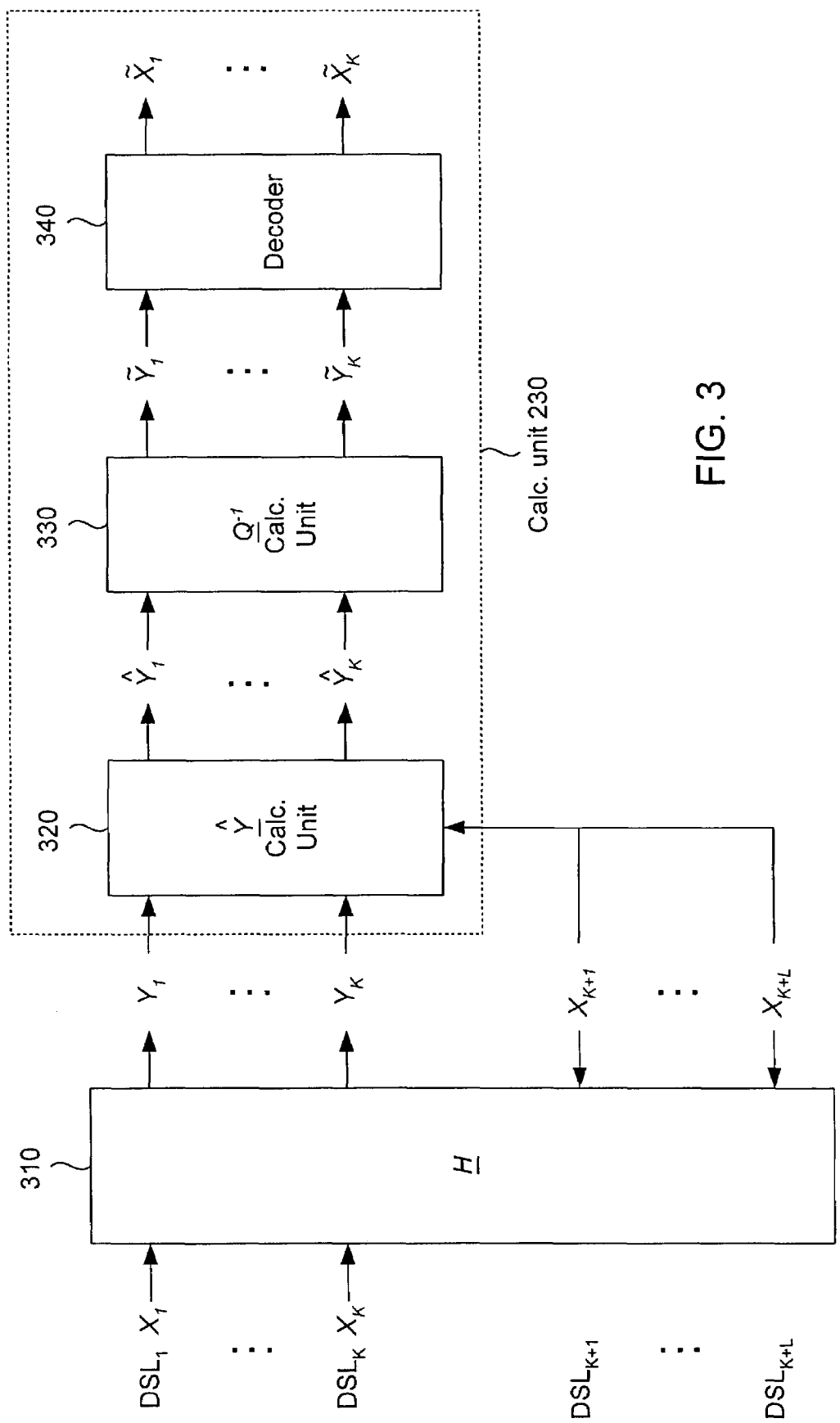
FIG. 3 is a block diagram of a VDMT system illustrating another embodiment of the present invention.

FIG. 3 is a block diagram illustrating a method and system of this embodiment of the present invention. The transmit signals $X_1, X_2, \ldots, X_K$ of $DSL_1, DSL_2, \ldots, DSL_K$, respectively, are transmitted through the matrix $\underline{H}$ 310, which represents the channels for the crosstalk environment shown in FIG. 2, and are received as signals $Y_1, Y_2, \ldots, Y_K$. The transmit signals $X_{K+1}, X_{K+2}, \ldots, X_{K+L}$ of $DSL_{K+1}, DSL_{K+2}, \ldots, DSL_{K+L}$ pass through $\underline{H}$ 310 and may contribute to NEXT. The received signals $Y_1, Y_2, \ldots, Y_K$ are input to the $\underline{\hat{Y}}$ calculation sub-unit 320 in calculation unit 230. $\hat{Y}_1, \hat{Y}_2, \ldots, \hat{Y}_K$ may be calculated as described above and then input to the $\underline{Q}^{-1}$ calculation sub-unit 330 based on the preceding description. $\tilde{Y}_1, \tilde{Y}_2, \ldots, \tilde{Y}_K$ are calculated in sub-unit 330 and may be sent to an appropriate decoder 340. After decoding, for example with Equations (10) and (11) and the like, the estimated values $\tilde{X}_1, \tilde{X}_2, \ldots, \tilde{X}_K$ of transmit signals $X_1, X_2, \ldots, X_K$ are obtained. The calculation unit 230 is assumed to know the channel/crosstalk matrix $\underline{H}$ 310 in advance.

Figure 4:
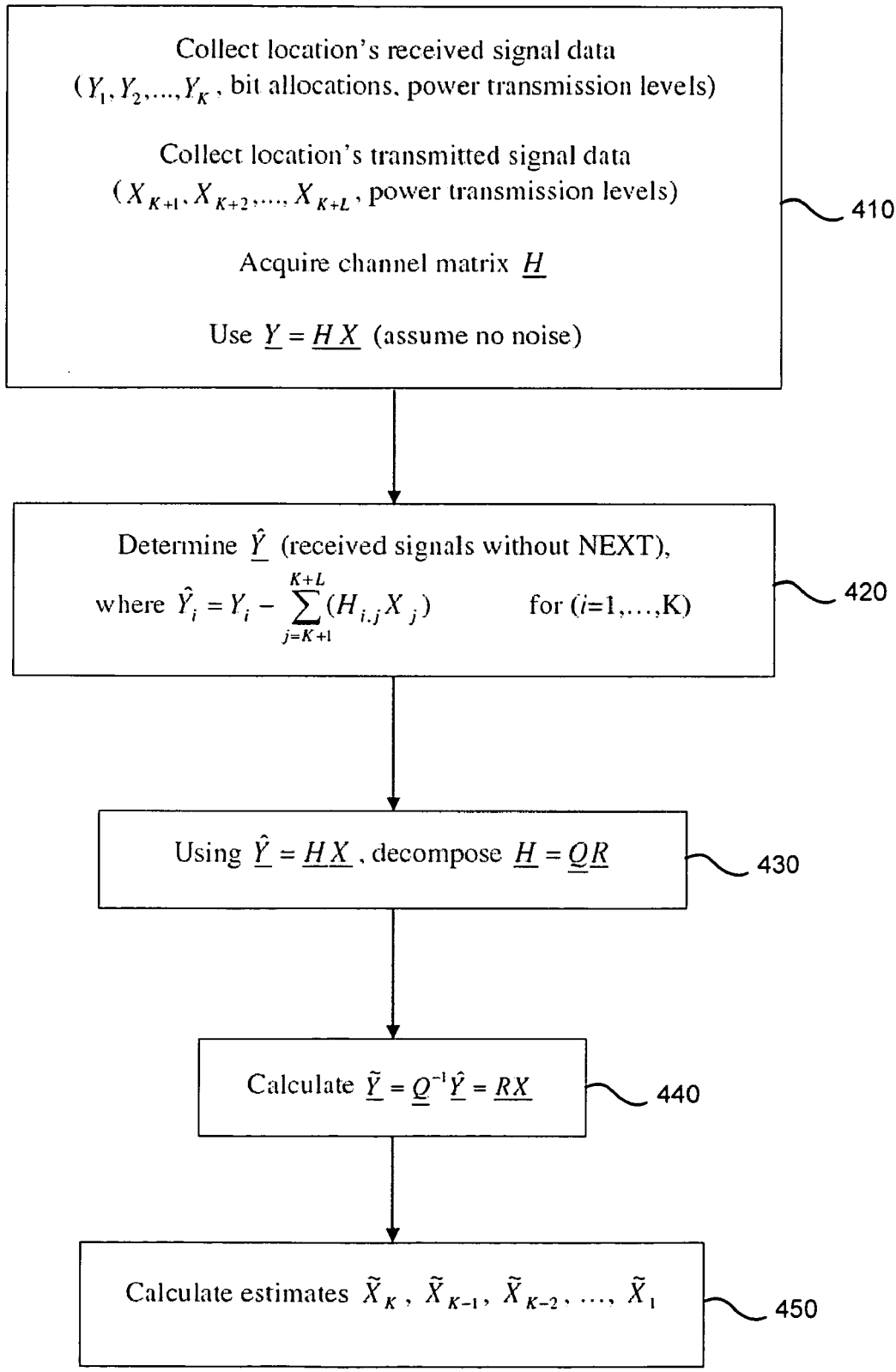
FIG. 4 is a flow diagram illustrating another embodiment of the present invention.

FIG. 4 is a flow diagram of one method embodiment of the present invention that is compatible with the systems of FIGS. 2 and 3, above. Initially, in step 410, the location's received signal data is collected. This received signal data includes:
  signals $Y_1, Y_2, \ldots, Y_K$;
  bit allocation data for these received signals; and
  transmission power level data for the signals $X_1, X_2, \ldots, X_K$.

The location's transmitted signal data also is collected. This includes the transmitted signals $X_{K+1}, X_{K+2}, \ldots, X_{K+L}$ and transmission power level data for these signals. Finally, the matrix $\underline{H}$ is acquired and this data is used to construct the transmission equation (Equation (2), above). In step 420, NEXT is removed by subtracting the location's transmitted signal interference from the received signals to obtain $\underline{\hat{Y}}$. At step 430, the matrix $\underline{H}$ is decomposed. At step 440, estimates of the received signals ($\tilde{Y}_1, \tilde{Y}_2, \ldots, \tilde{Y}_K$) are calculated. Finally, in step 450, the estimates of the transmitted signals ($\tilde{X}_1, \tilde{X}_2, \ldots, \tilde{X}_K$) are calculated to obtain the transmitted signals absent NEXT and FEXT interference.

Another embodiment of the present invention is illustrated in FIG. 5. The system of FIG. 5 shows a primary line, $DSL_K$, and multiple FEXT generating lines and multiple NEXT generating lines. Again, as will be appreciated by those skilled in the art, the present invention can be applied to a wide variety of situations and systems. For example, there may be very few lines introducing NEXT and/or very few lines introducing FEXT. Conversely, a large number of lines may contribute FEXT to the signal of interest, and similarly a large number of lines may contribute NEXT as well. The apparatus, techniques and methods of the present invention may be adapted to these and many other, more complicated systems. Only a few of the multiple FEXT and NEXT lines will be shown and explained herein for purposes of illustration. Again, notation in this description is for convenience and purposes of explanation and illustration.

In the system of FIG. 5, NEXT interference is first removed as discussed in detail below. After removal or reduction of any NEXT interference from the relevant signal(s), FEXT is then removed or reduced. When there is a calculation unit connected to each receiver in a system, such as the one shown in FIG. 5, each calculation unit receives only one DSL channel's signals, FEXT interference is canceled using only that line's received data, unlike the systems and methods described above. One effective FEXT removal method (and apparatus pertaining thereto) is an expectation cancellation (EC) method and/or apparatus, such as that described by Aldana and Cioffi in "Channel Tracking for Multiple Input, Single Output Systems using EM algorithm", ICC, Helsinki, Finland, Jun. 11-14, 2001, referred to as "Aldana" herein, which is incorporated herein by reference in its entirety. Techniques, methods and apparatus for use in connection with FEXT interference generated in an upstream direction will be described here with reference to the exemplary situation depicted in FIG. 5. Again, as will be appreciated by those skilled in the art, with minor modification, interference in the downstream direction also may be reduced or eliminated.

In the illustrative example shown in FIG. 5, as in the example illustrated in FIG. 2, there are (K+L) synchronized TDD DSL channels 570(1), (2), ..., (K−1), (K), (K+1), (K+2), ..., (K+L) corresponding to $DSL_1$, $DSL_2$, ..., $DSL_{K-1}$, $DSL_K$, $DSL_{K+1}$, $DSL_{K+2}$, ..., $DSL_{K+L}$. However, in the system of FIG. 5, unlike the system of FIG. 2, each receiver (or receiving transceiver) 510(1), (2), ..., (K) of $DSL_1$, $DSL_2$, ..., $DSL_K$ has its own calculation unit 530 and thus the only received signal data acquired by a given calculation unit 530 is data from the DSL channel connected to the receiver 510 connected to that calculation unit 530. Each transmitter (or transmitting transceiver) 520(K+1), (K+2), ..., (K+L) of DSL lines $DSL_{K+1}$, $DSL_{K+2}$, ..., $DSL_{K+L}$ is connected to each of the calculation units 530(1), ..., (K−1), (K). For purposes of illustrating the example of the present invention shown in FIG. 5, all of the receivers 510, transmitters 520 and calculation units 530 are located in a common CO unit 540. FIG. 5 illustrates the case where the received signal of $DSL_K$ can be affected by FEXT interference 550(1), (2), ..., (K−1) from the transmit signals of $DSL_1$, $DSL_2$, ..., $DSL_{K-1}$ and NEXT 560(K+1), (K+2), ..., (K+L) from the transmit signals of $DSL_{K+1}$, $DSL_{K+2}$, ..., $DSL_{K+L}$. The present example focuses on only one primary signal received at receiver 510(K) to illustrate joint NEXT and FEXT cancellation using the present invention. However, as will be appreciated by those skilled in the art, any and/or all of the received signals may be materially affected by NEXT and FEXT. Application of the present invention to any crosstalk affected DSL lines can reduce or eliminate NEXT and FEXT contamination in those lines.

$DSL_1$, $DSL_2$, ..., $DSL_K$ may use DSL types different than $DSL_{K+1}$, $DSL_{K+2}$, ..., $DSL_{K+L}$. However, the line code of all DSLs is the same (for example, DMT) and all are synchronized TDD DSLs. The type of DSL system used for $DSL_1$, $DSL_2$, ..., $DSL_K$ also does not matter; however, in this description, the line code of all DSLs is the same and all are synchronized TDD DSLs. Symbol synchronization eliminates problems such as intersymbol interference (ISI) and intercarrier interference (ICI).

The transmit signals of $DSL_1$, $DSL_2$, ..., $DSL_K$, $DSL_{K+1}$, $DSL_{K+2}$, ..., $DSL_{K+L}$ may be represented in the frequency domain as $X_1^t, X_2^t, ..., X_K^t, X_{K+1}^t, X_{K+2}^t, ..., X_{K+L}^t$ at time t (t=1,2, ..., T) and the received signal of $DSL_i$ (i=1,2, ..., K) at time t as $Y_i^t$. The channel transfer function of $DSL_i$ is defined as $H_{i,i}$ and the crosstalk coupling coefficient from $DSL_j$ (j=1,2, ..., K,K+1,K+2, ..., K+L; j≠i) to $DSL_i$ as $H_{i,j}$.

The channel transfer function of $DSL_i$ and all of the crosstalk coupling coefficients can be assumed to be stationary over time. Then, the received signals of $DSL_i$ in the noiseless case may be expressed in a matrix representation using the transmitted signals, the channel transfer function of $DSL_i$ and the crosstalk coupling coefficients.

$$\begin{pmatrix} Y_i^1 \\ Y_i^2 \\ \vdots \\ Y_i^T \end{pmatrix} = \begin{pmatrix} X_1^1 & X_2^1 & \ldots & X_K^1 & X_{K+1}^1 & X_{K+2}^1 & \ldots & X_{K+L}^1 \\ X_1^2 & X_2^2 & \ldots & X_K^2 & X_{K+1}^2 & X_{K+2}^2 & \ldots & X_{K+L}^2 \\ \vdots & \vdots & & \vdots & \vdots & \vdots & & \vdots \\ X_1^T & X_2^T & \ldots & X_K^T & X_{K+1}^T & X_{K+2}^T & \ldots & X_{K+L}^T \end{pmatrix} \begin{pmatrix} H_{i,1} \\ H_{i,2} \\ \vdots \\ H_{i,K} \\ H_{i,K+1} \\ H_{i,K+2} \\ \vdots \\ H_{i,K+L} \end{pmatrix} \quad (12)$$

This matrix equation may also be expressed using vectors $\underline{Y}$, $\underline{H}$ and matrix $\underline{X}$:

$$\underline{Y} = \underline{X}\underline{H} \quad (13)$$

In FIG. 5, according to one embodiment of the present invention, the calculation unit 530(i) of each receiver 510(i) acquires:

the received signals $Y_i^t$ (t=1,2, ..., T) of $DSL_i$;

bit allocation data for all received signals ($DSL_1$, $DSL_2$, ..., $DSL_K$); and transmission power level data for all signals ($DSL_1$, $DSL_2$, ..., $DSL_{K+L}$).

Each transmitter 520(K+1), (K+2), ..., (K+L) that can generate NEXT preferably supplies its transmit signals $X_{K+1}^t, X_{K+2}^t, ..., X_{K+L}^t$ (t=1,2, ..., T) corresponding to the relevant DSL channels $DSL_{K+1}$, $DSL_{K+2}$, ..., $DSL_{K+L}$ and, preferably, transmission power level data for these signals. Each calculation unit 530(i) acquires the vector $\underline{H}$ and the noise variance $\sigma^2$ from its respective calculation unit memory 580(i). Reliable estimates of the vector $\underline{H}$ and the noise variance $\sigma^2$ can be acquired using training and EC analysis and methods, as discussed in Aldana, referenced above. As will be appreciated by those skilled in the art, variations on this system may be implemented. For example, in an alternative system setting, only one receiving line 570 may have a calculation unit 530 and memory 580. As explained below, the present invention could nevertheless provide reliable estimates of the transmission data sought. Also, in special cases and configurations (for example, where the coupling functions are exactly or nearly the same and the receivers are not acting independently), a single memory for the vector $\underline{H}$ and the noise variance $\sigma^2$ may be maintained and accessed by each calculation unit 530 when needed. Using the present invention, the calculation unit 530(i) of $DSL_i$ can estimate the transmit signals $X_i^t$ (t=1,2, ..., T) of $DSL_i$.

Each calculation unit 530(i) first removes NEXT from the received signals $Y_i^t$ and calculates $\hat{Y}_i^t$ using the matrix $\underline{H}$ and the transmit signals $X_{K+1}^t, X_{K+2}^t, ..., X_{K+L}^t$:

$$\hat{Y}_i^t = Y_i^t - \sum_{j=K+1}^{K+L} (X_j^t H_{i,j}) \quad (14)$$

Again, as noted above, this is a very close approximation to the exact values of the received signals with the NEXT interference removed.

Using $\hat{Y}_i^t$ as calculated with Equation (14), Equation (12) then becomes:

$$\begin{pmatrix} \hat{Y}_i^1 \\ \hat{Y}_i^2 \\ \vdots \\ \hat{Y}_i^T \end{pmatrix} = \begin{pmatrix} X_1^1 & X_2^1 & \cdots & X_K^1 \\ X_1^2 & X_2^2 & \cdots & X_K^2 \\ \vdots & \vdots & \ddots & \vdots \\ X_1^T & X_2^T & \cdots & X_K^T \end{pmatrix} \begin{pmatrix} H_{i,1} \\ H_{i,2} \\ \vdots \\ H_{i,K} \end{pmatrix} \quad (15)$$

That is, $\hat{Y}_i^t$ represents the received signal data of $Y_i^t$ for line 570($i$) with any NEXT interference from lines 570(K+1) through 570(K+L) removed. The present invention can be implemented to remove NEXT interference from all lines, from only those lines producing a preselected minimum level of disruptive NEXT interference, or in any other appropriate manner, as will be apparent to one skilled in the art.

However, after the NEXT interference has been removed, FEXT interference remains in the received signals. That FEXT interference can then be removed using the present invention by finding the expected value of each transmit signal $X_i^t$ (t=1,2, ..., T) of $DSL_i$, which contains no FEXT or NEXT. The present invention also can be used to find the expected values of the transmit signals $X_1^t, X_2^t, X_K^t$ besides $X_i^t$ using only $Y_i^t$ as the received signal. However, in many cases, these other estimated transmitted signals can be calculated more accurately using the present invention and the received signal $Y_1^t, Y_2^t, \ldots, Y_K^t$ corresponding to each calculation unit 530(1), (2), ..., (K). Such an implementation assumes that the receivers share data. In many cases, however, each receiver may be operating independently and may not have access to other receivers' data. In situations such as the one noted above, where only one receiving line has a calculation unit, however, this alternative methodology and apparatus may be valuable.

Once the NEXT has been removed from a set of received signals $Y_i^t$ an EC method and/or apparatus according to the present invention can be used to remove FEXT in the received signals to permit calculation of the estimated values for the transmitted signals. To determine the estimates of the uncontaminated received signals, each calculation unit 530($i$) calculates the conditional probability $f_{Y|X}$ of the received signal $Y_i^t$ using the NEXT-less received signals $\hat{Y}_i^t$, the vector H and the noise variance $\sigma^2$, given each possible $\underline{X}^t$ (which is the $t^{th}$ row vector of the matrix $\underline{X}$):

$$f_{Y|X} = ce^{\frac{-\|(Y_i^t - X^t H)\|^2}{2\sigma^2}} \quad (16)$$

Note that c is a normalizing constant. The NEXT-less values of $\hat{Y}_i^t$ are used in Eq. (16) for $Y_i^t$.

The expected value E ($X_i^t$) of the transmit signal $X_i^t$ can be calculated using Bayes rule and be given by the equation:

$$E(X_i^t) = \frac{\sum (X_i f_{Y|X})}{\sum f_{Y|X}} \quad (17)$$

Using this method and/or any associated apparatus, the expected value of each transmit signal $X_i^t$ (t=1,2, ..., T) of line $DSL_i$, which contains no NEXT or FEXT, may be determined by that line's calculation unit 530($i$). This expected value represents an estimated value of $X_i^t$. As mentioned above, the calculation unit 530($i$) of the $i^{th}$ DSL line also can easily determine the expected values of the other transmit signals $X_1^t, X_2^t, \ldots, X_K^t$ besides $X_i^t$ using only $Y_i^t$ if desirable.

Thus, this EC based method (and/or any apparatus) gives estimated values in the minimum mean square error sense based on knowledge of the vector H. As will be appreciated by those skilled in the art, the vector $\overline{H}$ may be able to be updated from time to time with more precision. Alternatively, the estimated values also can be obtained in the maximum likelihood sense. In such a case, it would be necessary to search for the vector $\underline{X}^t$ (which is the $t^{th}$ row vector of the matrix $\underline{X}$) that minimizes d in the following:

$$d = \|(\hat{Y}_i^t - X^t H)\| \quad (18)$$

Figure 6:
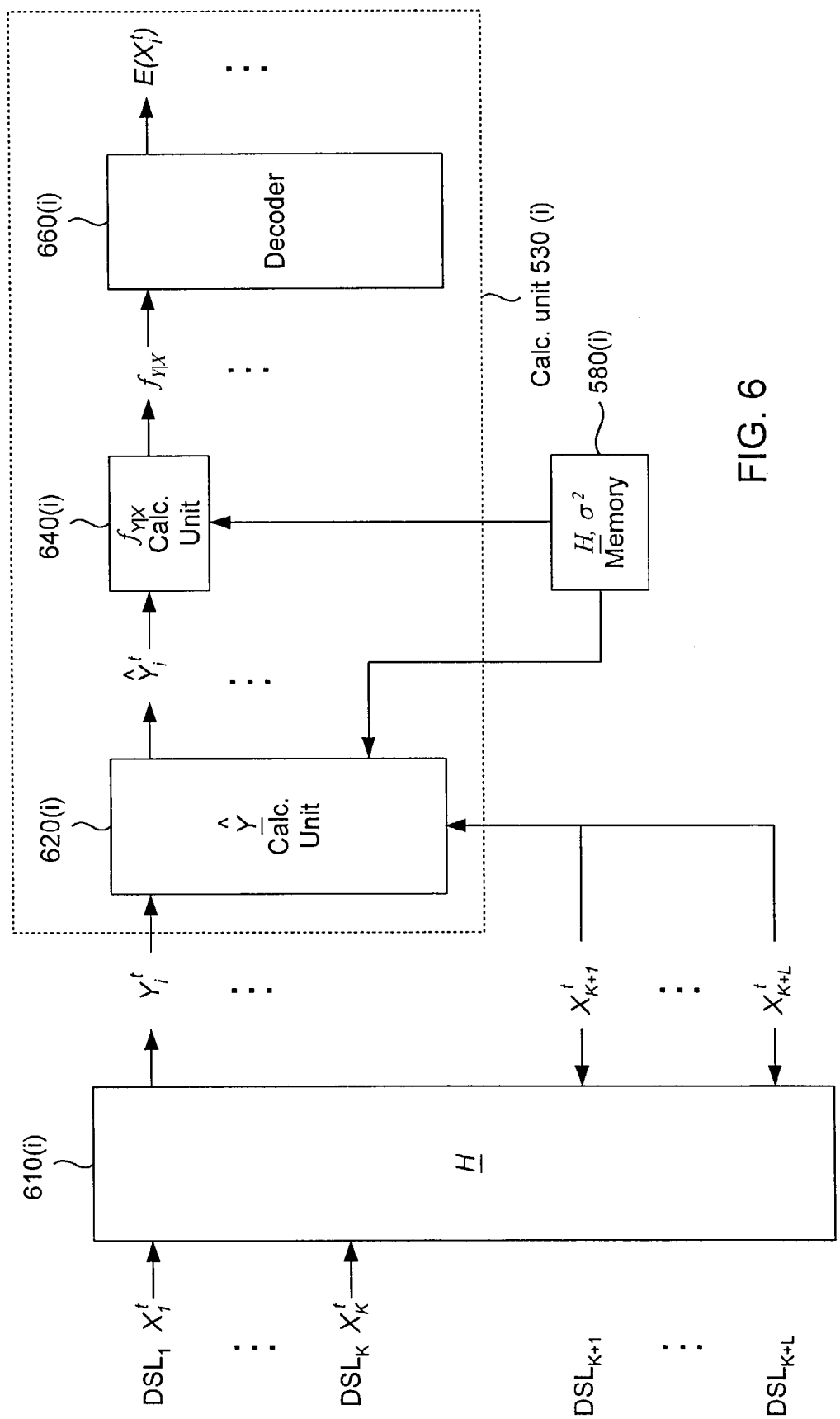
FIG. 6 is a block diagram of an EC system incorporating another embodiment of the present invention.

FIG. 6 is a block diagram showing the crosstalk canceling algorithm using the EC algorithm. The transmit signals $X_1^t$, $X_2^t, X_K^t$ (t=1,2, ..., T) of $DSL_1$, $DSL_2$, ..., $DSL_K$ are transmitted through the channel of $DSL_i$ assuming the crosstalk environment shown in FIG. 5 which is represented by the vector H 610($i$), and are received as signals $Y_i^t$ (t=1,2, ..., T) of $DSL_i$. The transmit signals $X_{K+1}^t$, $X_{K+2}^t, \ldots, X_{K+L}^t$ of $DSL_{K+1}$, $DSL_{K+2}$, ..., $DSL_{K+L}$ can contribute to NEXT interference. The received signals $Y_i^t$ are input to the $\hat{Y}$ calculation sub-unit 620($i$) in the calculation unit 530($i$) which is connected to the receiver 510($i$) of $DSL_i$. After processing using the method expressed in Equation (14), the outputs $\hat{Y}_i^t$ (t=1,2, ..., T) are input to the $f_{Y|X}$ calculation sub-unit 640($i$) according to the described EC based FEXT canceling method. The $f_{Y|X}$ calculation sub-unit 640($i$) calculates each of the conditional probability $f_{Y|X}$ of $\hat{Y}_i^t$ using the method expressed in Equation (16) with the vector H and the noise variance $\sigma^2$ from the H, $\sigma^2$ memory 580($i$). Then each of $f_{Y|X}$ are input to the decoder 660($i$). After decoding using the method expressed in Equation (17), the expected values E ($X_i^t$) of the transmit signals $X_i^t$ (t=1,2, ..., T) of $DSL_i$ are obtained. The vector H and the noise variance $\sigma^2$ are assumed to be known and should be input to the $\underline{H}$, $\sigma^2$ memory 580($i$) in advance.

Figure 7:
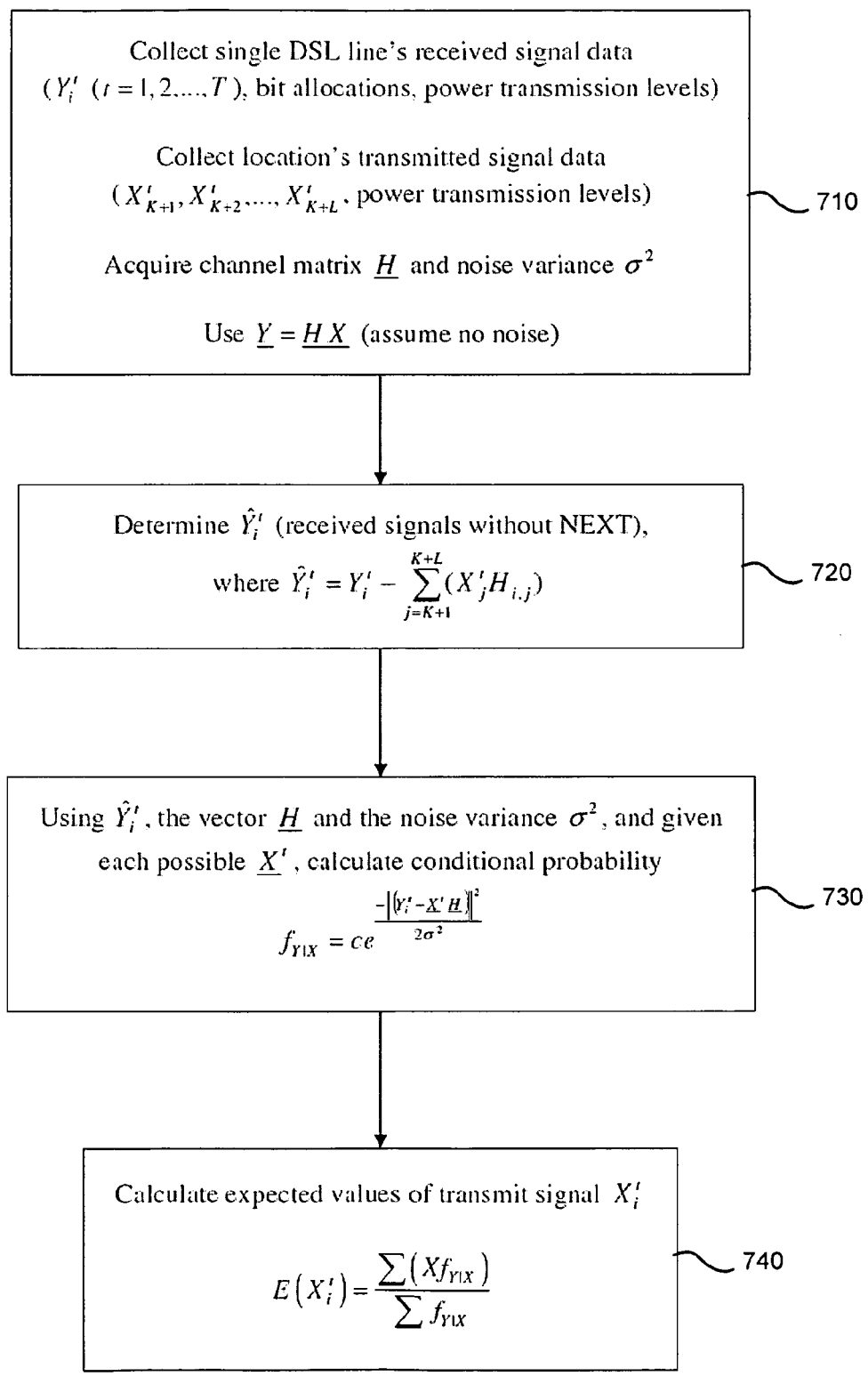
FIG. 7 is a flow diagram illustrating another embodiment of the present invention.

FIG. 7 is a flow diagram illustrating one embodiment of a method of the present invention in accordance with FIGS. 5 and 6, above. Initially, in step 710, the received signal data for a single DSL line, $DSL_i$, is collected. This received signal data includes:

signals $Y_i^t$;
bit allocation data for all received signals ($DSL_1$, $DSL_2, \ldots, DSL_K$); and
transmission power level data for all signals ($DSL_1$, $DSL_2, \ldots, DSL_{K+L}$).

The location's transmitted signal data also is collected. This includes the transmitted signals $X_{K+1}^t, X_{K+2}^t, \ldots, X_{K+L}^t$ and transmission power levels data for these signals. Finally, the matrix $\underline{H}$ and noise variance $\sigma^2$ are acquired and this data is used to construct the transmission equation. In step 720, NEXT is removed by subtracting the location's transmitted signal interference from the received signals to obtain NEXT-less received signals $\hat{Y}_i^t$. At step 730, using $\hat{Y}_i^t$, the vector H and the noise variance $\sigma^2$, and given each possible $X^t$, the conditional probability $f_{Y|X}$ is calculated. Finally, at step 740, the expected values $E(X_i^t)$ of transmit signal $X_i^t$ are calculated to obtain the transmitted signals without NEXT and FEXT interference.

Although the foregoing invention has been described in some detail for purposes of clarity of understanding, it will be apparent that variations, changes and modifications will fall within the scope of the appended claims, depending on the particular goals of the analysis and crosstalk identification. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method of removing crosstalk from a primary signal sent over a primary channel in a synchronized time division duplexed (TDD) digital subscriber line (DSL) system comprising a near-end crosstalk (NEXT) generating channel that generates NEXT interference in the primary signal and further comprising a far-end crosstalk (FEXT) generating channel that generates FEXT interference in the primary signal, the method comprising:
   acquiring signal data, wherein the signal data comprises;
      received signal data for the primary channel and the FEXT generating channel;
      transmitted signal data for the NEXT generating channel;
      channel data comprising channel transfer function data and crosstalk coupling coefficient data for the primary channel, the NEXT generating channel and the FEXT generating channel;
   removing NEXT interference in the primary signal using the transmitted signal data and the channel data; and
   removing FEXT interference in the primary signal using vectored discrete multitone (DMT) FEXT removal the received signal data and the channel data, wherein the vectored DMT FEXT removal includes,
      organizing the channel data for the FEXT generating channel and the primary channel into a FEXT data matrix,
      calculating a decomposition based on the FEXT data matrix, and
      calculating a primary signal estimate that is an estimate of the primary signal.

2. A method of removing crosstalk from a primary signal sent over a primary channel in a synchronized time division duplexed (TDD) digital subscriber line (DSL) system comprising a near-end crosstalk (NEXT) generating channel that generates NEXT interference in the primary signal and further comprising a far-end crosstalk (FEXT) generating channel that generates FEXT interference in the primary signal, the method comprising:
   acquiring signal data, wherein the signal data comprises;
      received signal data for the primary channel and the FEXT generating channel;
      transmitted signal data for the NEXT generating channel;
      channel data comprising channel transfer function data and crosstalk coupling coefficient data for the primary channel, the NEXT generating channel and the FEXT generating channel;
   removing NEXT interference in the primary signal using the transmitted signal data and the channel data; and
   removing FEXT interference in the primary signal using vectored discrete multitone (DMT) FEXT removal, the received signal data and the channel data, wherein vectored DMT FEXT removal comprises:
      organizing the channel data for the FEXT generating channel and the primary channel into a FEXT data matrix;
      calculating a QR decomposition for the FBXT data matrix; and
      calculating a primary signal estimate that is an estimate of the primary signal.

3. The method of claim 1 wherein the transmitted signal data comprises:
   a transmitted signal transmitted on the NEXT generating channel; and
   transmission power level data for the transmitted signal.

4. The method of claim 1 wherein the received signal data comprises:
   a received signal received on the FEXT generating channel;
   bit allocation data for the received signal;
   transmission power level data for the received signal;
   the primary signal received on the primary channel;
   bit allocation data for the primary signal; and
   transmission power level data for the primary signal.

5. The method of claim 1 wherein the step of removing NEXT interference comprises:
   (a) calculating the NEXT interference contribution from the NEXT generating channel using the transmitted signal data and the channel data relating to the coupling between the NEXT generating channel and the primary channel; and
   (b) subtracting the calculated NEXT interference contribution from the NEXT generating channel.

6. The method of claim 1 wherein there are a plurality of NEXT generating channels; and
   further wherein the signal data further comprises;
      transmitted signal data for each of the plurality of NEXT generating channels;
      the channel data further comprising crosstalk coupling coefficient data for each of the plurality of NEXT generating channels; and
   further wherein the step of removing NEXT interference comprises:
      calculating The NEXT interference contribution from each of the plurality of NEXT generating channels using the transmitted signal data and the channel data relating to the coupling between each of the plurality of NEXT generating channels and the primary channel; and
      subtracting the calculated NEXT interference contribution from each of the plurality of NEXT generating channels.

7. The method of claim 1 wherein the step of removing NEXT interference from the primary signal is performed until a prescribed minimum amount of NEXT interference is present in the primary signal.

8. A method of removing crosstalk from a primary signal sent over a primary channel in a synchronized time division duplexed (TDD) digital subscriber line (DSL) system comprising a near-end crosstalk (NEXT) generating channel that generates NEXT interference in the primary signal and further comprising a plurality of far-end crosstalk (FEXT) generating channels that generate FEXT interference in the primary signal, the method comprising:

acquiring signal data, wherein the signal data comprises;
  received signal data for the primary channel;
  received signal data for each of the plurality of FEXT generating channels;
  transmitted signal data for the NEXT generating channel;
  channel data comprising channel transfer function data and crosstalk coupling coefficient data for the primary channel, the NEXT generating channel and each of the plurality of FEXT generating channels
removing NEXT interference in the primary signal using the transmitted signal data and the channel data; and
removing FEXT interference in the primary signal using vectored discrete multitone (DMT) FEXT removal, the received signal data and the channel data, wherein the step of vectored DMT FEXT removal comprises:
  organizing the channel data for each of the plurality of FEXT generating channels and the primary channel into a FEXT data matrix;
  calculating a QR decomposition for the FEXT data matrix; and
  calculating a primary signal estimate that is an estimate of the primary signal.

9. A system for removing crosstalk from a primary synchronized time division duplexed (TDD) signal comprising:
  a set of channels comprising:
    a primary channel on which the primary signal is sent;
    a first subset of transmitting channels;
    a first subset of receiving channels;
  a calculation unit connected to the set of channels, the calculation unit configured to:
    acquire signal data, wherein the signal data comprises;
      transmitted signal data for any near-end crosstalk (NEXT) generating channel that is in the first subset of transmitting channels;
      received signal data for any far-end crosstalk (FEXT) generating channel that is in the first subset of receiving channels;
      channel data comprising data pertaining to channel transfer functions and crosstalk coupling coefficients for the primary channel, any NEXT generating channel and any FEXT generating channel;
    remove NEXT interference in the primary signal using the transmitted signal data and the channel data; and
    remove FEXT interference in the primary signal using a vectored discrete multitone (DMT) cancellation process and the received signal data and the channel data,wherein the vectored DMT FEXT removal cancellation process comprises:
      organizing the channel data for the FEXT generating channels and the primary channel into a FEXT data matrix;
      calculating a decomposition based on the FEXT data matrix; and
      calculating a primary signal estimate that is an estimate of the primary signal.

10. A method of removing crosstalk from a primary signal sent over a primary channel in a synchronized time division duplexed (TDD) digital subscriber line (DSL) system comprising a near-end crosstalk (NEXT) generating channel that generates NEXT interference in the primary signal and further comprising a far-end crosstalk (FEXT) generating channel that generates FEXT interference in the primary signal, the method comprising:

acquiring signal data, wherein the signal data comprises;
  received signal data for the primary channel;
  transmitted signal data for the NEXT generating channel; and
  channel data comprising:
    noise variance data;
    channel transfer function data; and
    crosstalk coupling data for the primary signal channel, the NEXT generating channel and the FEXT generating channel;
removing NEXT interference in the primary signal using the transmitted signal data and the channel data; and
removing FEXT interference in the primary signal using expectation cancellation, the primary signal and the channel data, wherein expectation cancellation comprises calculating a conditional probability of the primary signal in light of a set of possible transmitted signals.

11. The method of claim 10 wherein the transmitted signal data comprises:
  a transmitted signal transmitted on the NEXT generating channel; and
  transmission power level data for the transmitted signal.

12. The method of claim 10 wherein the received signal data comprises:
  the primary signal;
  bit allocation data for the primary signal and for the FEXT generating channel; and
  transmission power level data for the primary signal and for the FEXT generating channel.

13. The method of claim 10 wherein the step of removing NEXT interference comprises:
  (a) calculating the NEXT contamination contribution from the NEXT generating channel using the transmitted signal data and the channel data relating to the coupling between the NEXT generating channel and the primary channel;
  (b) subtracting the calculated NEXT interference from the primary signal.

14. The method of claim 10 wherein the step of removing NEXT contamination from the primary signal is performed until a prescribed minimum amount of NEXT contamination is present in the primary signal.

15. A system for removing crosstalk from a primary synchronized time division duplexed (TDD) signal comprising:
  a primary channel on which the primary signal is sent;
  a near-end crosstalk (NEXT) generating channel;
  a far-end crosstalk (FEXT) generating channel;
  a calculation unit connected to the primary channel, the calculation unit configured to:
    acquire signal data, wherein the signal data comprises;
      transmitted signal data for the primary channel and the NEXT generating channel;
      received signal data for the FEXT generating channel; and
      channel data comprising:
        noise variance data;
        channel transfer function data; and
        crosstalk coupling data for the primary signal channel, the NEXT generating channel and the FEXT generating channel;

remove NEXT interference in the primary signal using the transmitted signal data and the channel data; and
remove FEXT interference in the primary signal using expectation cancellation, the primary signal and the channel data, wherein expectation cancellation comprises calculating a conditional probability of the primary signal in light of a set of possible transmitted signals.

* * * * *